March 8, 1966  A. CLARKSON  3,238,957
MAGNETIC HEADING CONTROL FOR AIRCRAFT
Filed Nov. 28, 1962  4 Sheets-Sheet 1

INVENTOR.
ALICK CLARKSON
BY
Knox & Knox

March 8, 1966   A. CLARKSON   3,238,957
MAGNETIC HEADING CONTROL FOR AIRCRAFT
Filed Nov. 28, 1962   4 Sheets-Sheet 2

INVENTOR.
ALICK CLARKSON
BY
Knox & Knox

INVENTOR.
ALICK CLARKSON

March 8, 1966  A. CLARKSON  3,238,957
MAGNETIC HEADING CONTROL FOR AIRCRAFT
Filed Nov. 28, 1962  4 Sheets-Sheet 4

INVENTOR.
ALICK CLARKSON
BY Knox & Knox

United States Patent Office 3,238,957
Patented Mar. 8, 1966

3,238,957
MAGNETIC HEADING CONTROL FOR AIRCRAFT
Alick Clarkson, Paul Spur, Ariz., assignor, by mesne assignments, to Brittain Industries, Inc., Hawthorne, Calif., a corporation of California
Filed Nov. 28, 1962, Ser. No. 240,683
2 Claims. (Cl. 137—38)

The present invention relates generally to aircraft instruments and more particularly to a magnetic heading control.

The primary object of this invention is to provide a magnetic heading control for aircraft wherein a simple magnetic compass is coupled directly to the directional controls of an aircraft to maintain a selected course, the compass having eddy current damping inherent in its construction.

Another object of this invention is to provide a magnetic heading control incorporating an integral valve which controls a vacuum actuated control surface operating system, thus eliminating electrical wiring or intercoupling of multiple instruments.

Another object of this invention is to provide a magnetic heading control with which a required heading can be dialed directly and will then be acquired and held accurately.

A further object of this invention is to provide a magnetic heading control which is only slightly larger than a conventional directional compass and requires only two simple vacuum hose connections to the control system.

Finally, it is an object to provide a magnetic heading control of the aforementioned character which is simple and convenient to manufacture and install and which will give generally efficient and durable service.

With these and other objects definitely in view, this invention consists in the novel construction, combination and arrangement of elements and portions, as will be hereinafter fully described in the specification, and in which.

*Magnetic heading unit*

Figure 1:
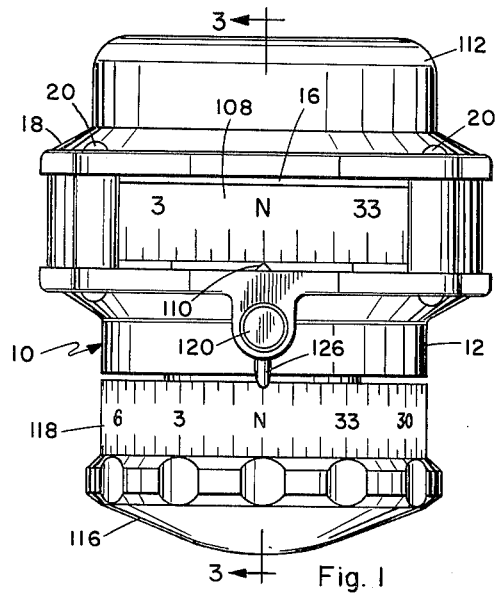
FIGURE 1 is a front elevation view of the magnetic heading control.
Figure 2:
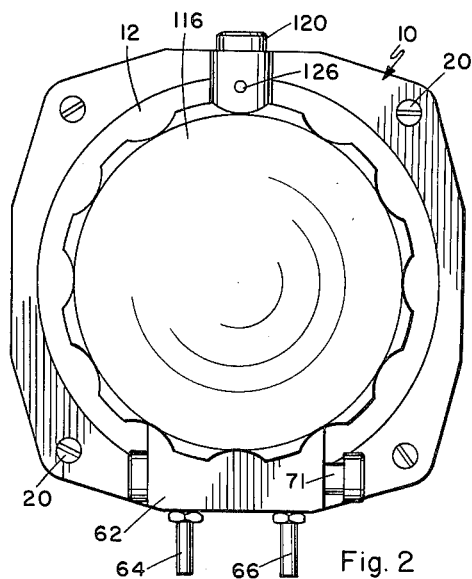
FIGURE 2 is a bottom plan view thereof.
Figure 3:
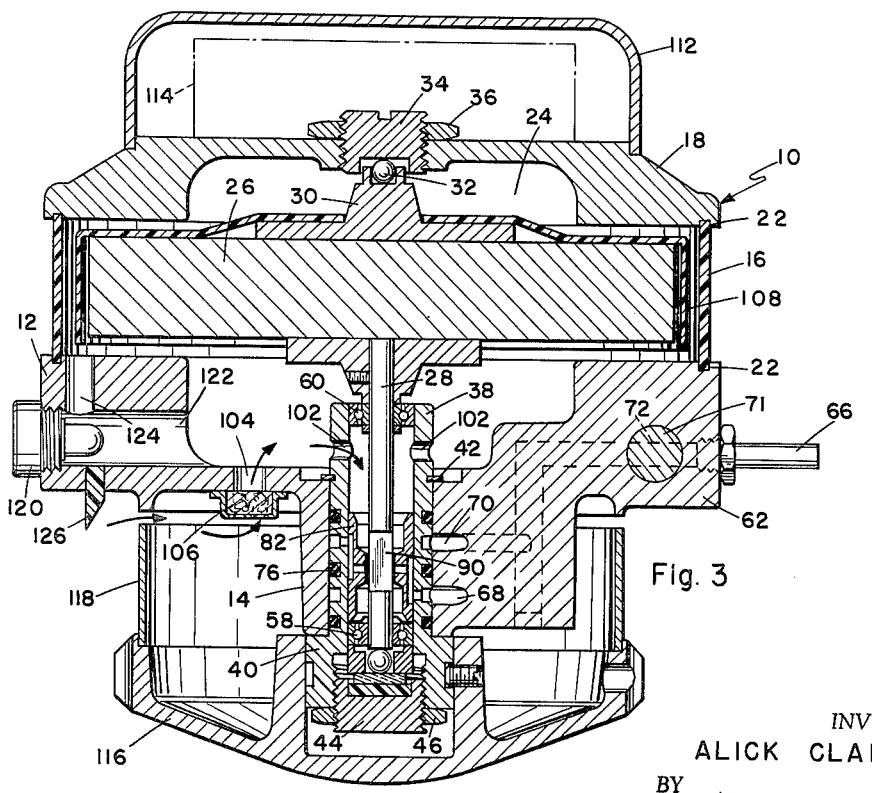
FIGURE 3 is an enlarged sectional view taken on line 3—3 of FIGURE 1.
Figure 4:
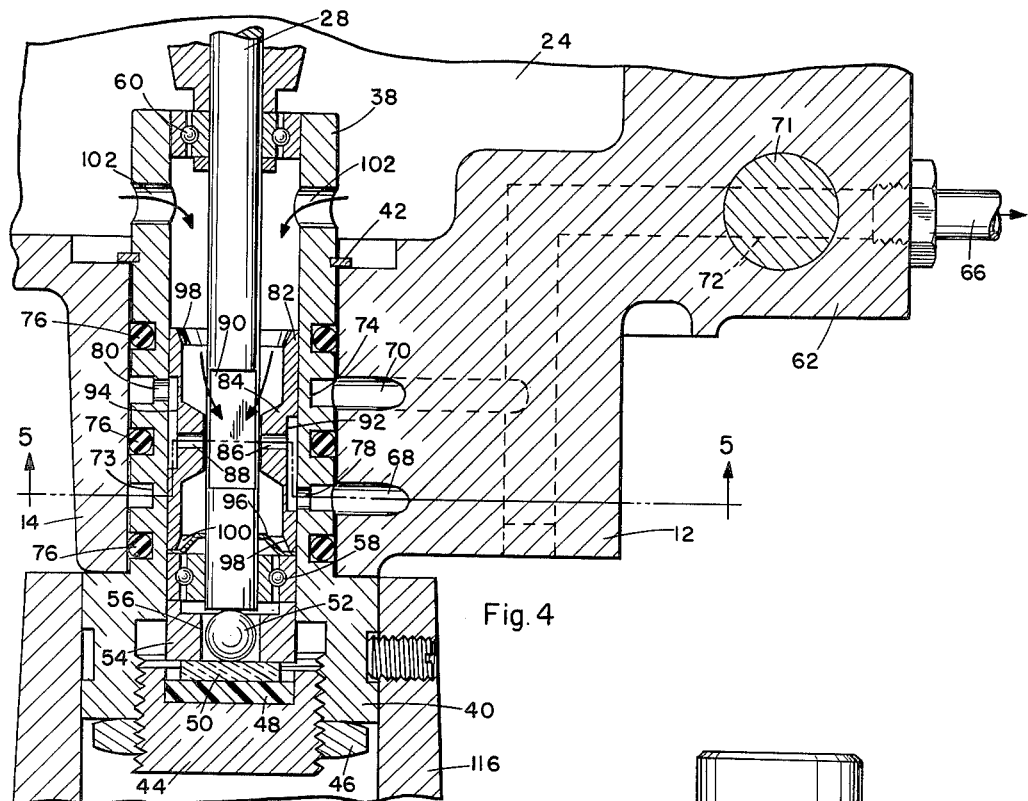
FIGURE 4 is a further enlarged sectional view of the valve portion shown in FIGURE 3.

The heading unit, indicated generally at 10, is illustrated in detail in FIGURES 1-5 and comprises a casing 12 having an axially downwardly extending barrel portion 14. On top of the casing 12 is a cylindrical annular window 16, over which is fitted a top cap 18 secured to said casing by suitable screws 20. Casing 12 and top cap 18 both have annular grooves 22 to receive the edges of annular window 16 and enclose a sealed chamber 24. Within the chamber 24 is a large magnet 26 mounted on a vertical shaft 28. On top of magnet 26 is a boss member 30 in which is seated an axial ball 32, said ball riding in an upper bearing plug 34 threaded into top cap 18 and secured by a lock nut 36. Axially rotatably mounted in barrel portion 14 is a cylindrical valve body 38 having an enlarged lower head 40 and being held at the upper end by a retaining ring 42. Threaded into the lower end of head 40 is a lower bearing plug 44 secured by a lock nut 46. While various lower bearings may be used, the arrangement illustrated has been found to be particularly free turning trouble free. In the lower bearing plug 44 is a plastic pad 48 on which is supported a bearing plate 50 of sapphire or similar material. The shaft 28 rides on a ball 52 which rests on bearing plate 54, the ball being contained in a collar 48 within an oversize bore 56 which allows the ball to have a slight orbital action rather than being closely confined. The shaft 28 is axially aligned within valve body 38 by upper and lower ball bearing 58 and 60 respectively.

Casing 12 has an extended portion 62 at the rear in which are a pair of hose connections 64 and 66, from which passages 68 and 70 lead to the valve body 38. A slide type shut-off valve 71 is fitted through the extended portion 62 intersecting passages 68 and 70, said valve having openings 72 to align with the passages in one position and being slidable to close the passages in another position. The passages 68 and 70 are angled inwardly and meet valve body 38 at spaced axially aligned positions, said valve body having axially spaced annular channels 73 and 74 aligned respectively with passages 68 and 70. The valve body 38 is sealed by O-rings 76 between and on either side of channels 73 and 74. Channel 73 has a port 78 opening to the interior of valve body 38 and channel 74 has a similar port 80 diametrically opposite port 78 but axially spaced therefrom. Fixed inside valve body 38 is a hollow, cylindrical valve sleeve 82 at the center of which is an inwardly thickened portion 84 fitting closely around shaft 28. In the thickened portion 84 are diametrically opposed apertures 86 and 88 and, in the region of the apertures, shaft 28 has a cut-away flat portion 90, the shaft itself constituting a valve element. The exterior of valve sleeve 82 has an elongated slot 92 extending from aperture 86 to port 78 and a similar slot 94 from aperture 88 to port 80. Held between the lower end of valve sleeve 82 and bearing 60 is a generally conical shield 96, said valve sleeve having a chamfered inner edge 98 to form a dirt pocket 100 which prevents dirt from entering the lower bearing. Both ends of valve sleeve 82 may have the chamfered edges, so that the valve sleeve is made reversible for ease of assembly. In the upper end of valve body 38 are air inlet ports 102 communicating with the chamber 24 and in casing 12 is a primary air inlet 104 fitted with a filter 106.

Secured over magnet 26 is a compass card 108 marked in degrees in the conventional manner and being visible through window 16, the front of which has an index marker 110. With casing 12 and top cap 18 made of metal, the magnetic field provides considerable eddy current damping and prevents oscillation of the magnet 26. For this reason compass card 108 is preferably of non-magnetic or diamagentic material, such as plastic, to prevent shielding. Fitted on top cap 18 is a cover 112 to enclose the usual magnetic corrector 114, well known in conventional compasses.

Mounted on the head 40 of valve body 38 is a large control knob 116 fitted with an annular dial 118 marked in degrees and aligned to correspond with the compass card 108. For convenience a lamp 120 is mounted in a socket 122 in body 12 and a tunnel 124 extends upwardly therefrom to illuminate the compass card 108, while a translucent pointer 126 extends downwardly to illuminate dial 118 and serve as an index mark. The wiring for the lamp is omitted for simplicity.

Control system

Figure 6:
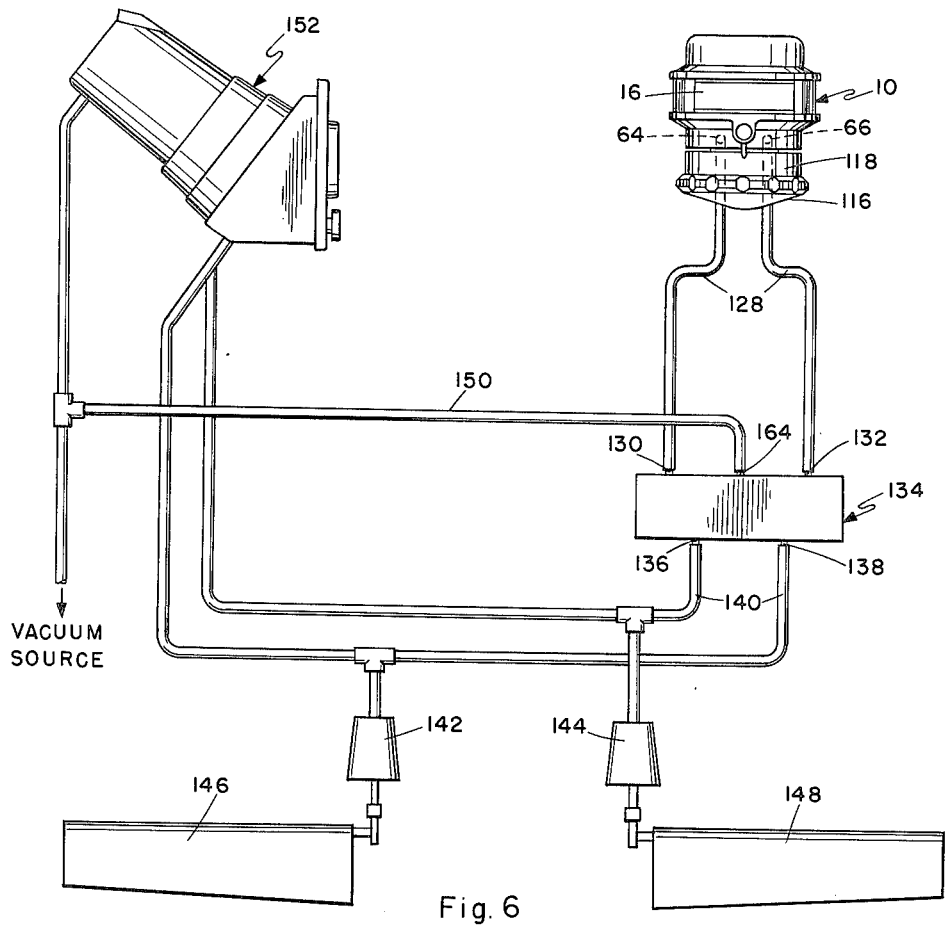
FIGURE 6 is a diagram of the control system.

The heading unit 10 is incorporated into a control system as illustrated in FIGURE 6. In this system hoses 128 lead from connections 64 and 66 of the heading unit to inlets 130 and 132 of a pneumatic relay 134, the outlets 136 and 138 of which are connected by hoses 140 to a pair of vacuum operated actuators 142 and 144, which move the aircraft ailerons 146 and 148, respectively, through conventional mechanisms. The actuators 142 and 144 can, in fact, be coupled to existing control cables or rods, this type of power assisted control being well known. A vacuum supply hose 150, from any suitable source of vacuum such as a venturi, is also connected to the relay 134.

The system also includes a directional control unit 152, such as disclosed in U.S. Patent No. 3,006,580, entitled Flight Control Means for Aircraft. This unit controls the direction of flight by means of a special gyroscope assembly coupled through vacuum operated actuators to the ailerons and can be coupled to actuators 142 and 144 in parallel with the heading unit 10. In this arrangement the directional control unit maintains the aircraft in straight and level flight, while the heading unit 10 acts as a heading lock to hold the aircraft on a selected compass heading. The single vacuum source is the only power required to operate the entire system.

Figure 7:
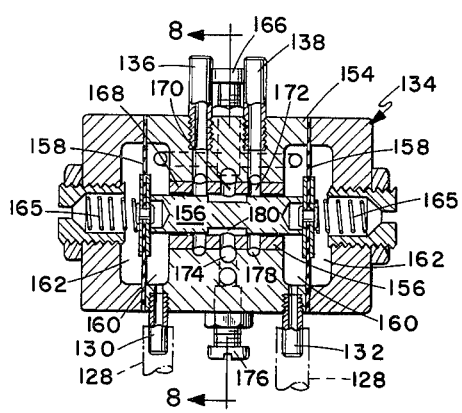
FIGURE 7 is a longitudinal sectional view of a pneumatic relay suitable for the system.
Figure 8:
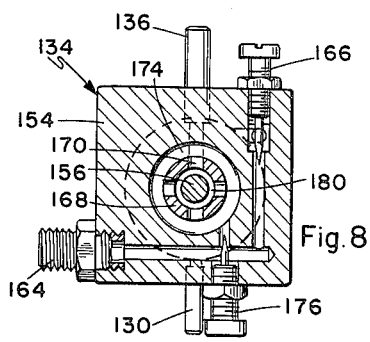
FIGURE 8 is a sectional view taken on line 8—8 of FIGURE 7.

The relay 134, illustrated in FIGURES 7 and 8, is substantially conventional and comprises a body 154 in which is an axially slidable valve element 156 coupled to diaphragms 158 at both ends, said diaphragms each having a pressure chamber 160 on one side and a vented chamber 162 on the other side. Inlets 130 and 132 lead to the pressure chambers 160 which are coupled to a vacuum inlet 164 through a needle valve 166. Fixed in the body 154 and surrounding valve element 156 is a sleeve 168 having a central set of radial inlet ports 170 and a set of transfer ports 172 on either side thereof. The inlet ports 170 register with an inlet channel 174 in body 154, which communicates with the vacuum inlet 164 through a needle valve 176. Transfer ports 172 register with channels 178 which connect with the outlets 136 and 138. Valve element 156 has a central annular groove 180 which, when the valve element moves axially, can connect the vacuum inlet 164 with either outlet 136 or 138. The valve element 156 is centered by light springs 165 against diaphragms 158.

Needle valve 166 is adjusted to apply a slight vacuum to the pressure chambers 160, while needle valve 176 is adjusted to apply a considerable vacuum. Thus any unequal pressure in pressure chambers 160 will move the diaphragms 158 and cause valve element 156 to slide, so applying vacuum to either outlet 136 or 138. The function is well known and other types of relays may be used, that illustrated being an example of a particularly suitable type.

Operation of system

In flight the aircraft is held straight and level by the directional control unit, as described in the above mentioned issued patent. The required compass heading is set on dial 118 by turning control knob 116. Setting the dial 118 is the only operation necessary by the pilot. The rotation of control knob 116 turns valve body 38, together with sleeve 82, and offsets the apertures 86 and 88 relative to the flat portion 90 of shaft 28, as in FIGURE 5. A constant vacuum is applied to passages 68 and 70 from the vacuum source, air being drawn through inlet 104 and inlet ports 102, through valve body 38 and through the apertures 86 and 88 over a flat portion 90 to said passages, as indicated by directional arrows in FIGURES 3–5. If the valve body 38 is positioned so that both apertures 86 and 88 are equally exposed by flat valve element portion 90, the vacuum pressure will be equal in both passages 68 and 70 and no control action will occur.

Figure 5:
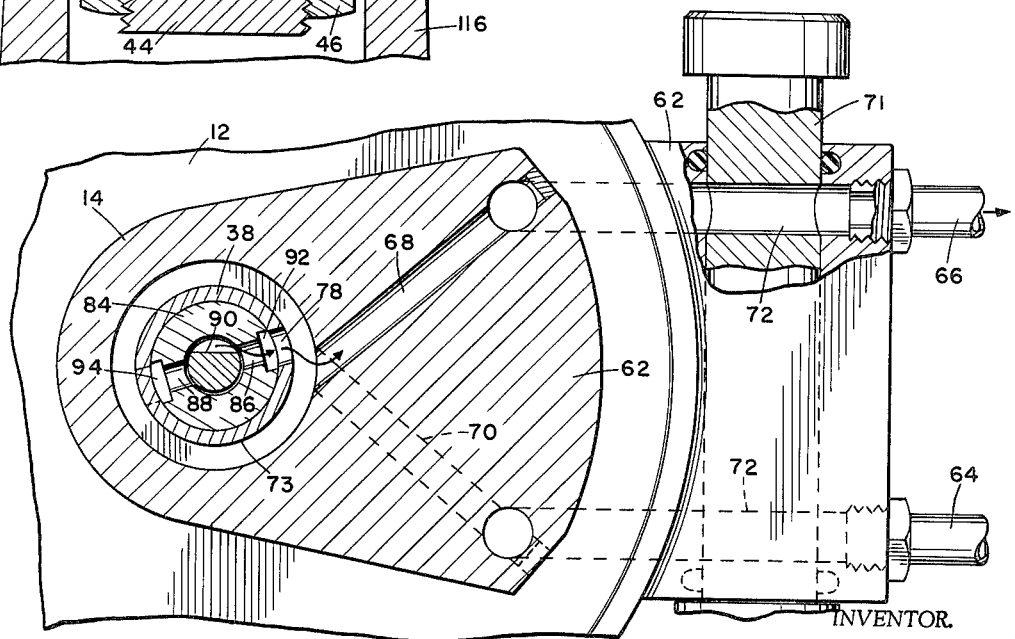
FIGURE 5 is a sectional view taken on line 5—5 of FIGURE 4.

However, if the valve body is turned, as in FIGURE 5, so that the exposure of apertures 86 and 88 is unequal, or one aperture is blocked, the air flow will be greater through one aperture to the appropriate connected passage. The shaft 28, being fixed to magnet 26 is, of course, held stationary by the magnet as the valve body 38 is turned. The unequal pressure continuing through hoses 128 causes the relay 134 to operate and apply vacuum to one or other of the actuators 142 and 144. This produces movement of the ailerons 146 and 148 to turn the aircraft to the required heading, the turn continuing until the valve body 38, now fixed in relation to the aircraft, is brought into alignment with flat portion 90 and both apertures 86 and 88 are once more equally exposed. Pressures are then equalized and the ailerons are neutral. Any deviation of the aircraft causes rotation of the valve body 38 about shaft 28 and every deviation is sensed as unequal pressure, which produces a correcting control action.

It has been found in flight test that the heading unit is very sensitive and will maintain the aircraft on a selected heading with great accuracy. Deviations are sensed instantly and corrective control applied constantly, the actual motions being virtually undectable due to the sensitivity and rapid response. A large magnet 26 has been found to be more effective than the small type used in most directional compasses, since alignment is more accurately maintained and the eddy current damping provided by the metallic structure of the unit prevents oscillation of the magnet.

The heading unit is very compact and easily mounted in a convenient position in an aircraft. The only connections to the unit are the vacuum hoses 128, which can be small and are readily concealed. When not required the heading unit can be completely shut off by valve 71 directly on the unit.

Alternative heading unit

Figure 9:
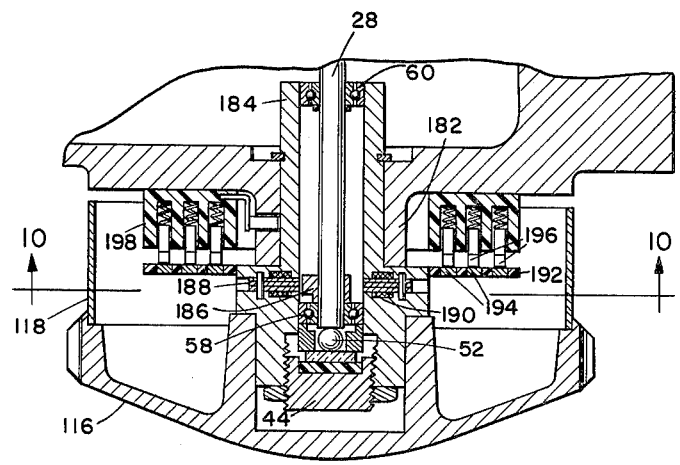
FIGURE 9 is a sectional view similar to a portion of FIGURE 3, showing the adaptation to an electrical pick-off.
Figure 10:
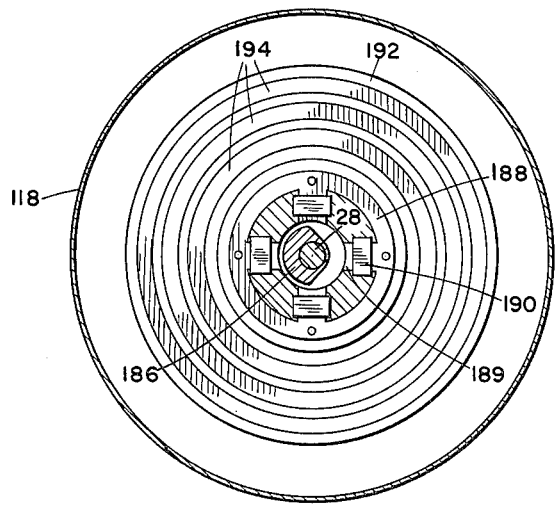
FIGURE 10 is a sectional view taken on line 10—10 of FIGURE 9.

In some aircraft it may be more convenient to obtain an electrical output from the heading unit, if vacuum operated controls are not adaptable. The unit is readily adaptable to electrical pick-off means as illustrated in FIGURES 9 and 10. The upper portion of the main casing with the magnet assembly and compass card is unchanged, as is the control knob 116 and dial 118. On the lower end of the casing is a downwardly extending barrel portion 182 in which is an axially rotatable sleeve 184, to which knob 116 is fixed. The lower end of sleeve 184 contains the complete bearing and support assembly for shaft 28 as previously described. Fixed to the shaft 28 is a ferro-magnetic armature segment 186 to rotate with the shaft, and in the sleeve 184, coplananar and concentric with said armature, is a multiple pole core 188, the poles 189 of which have windings 190. Fixed to and concentric with sleeve 184 is a contact disc 192 carrying slip rings 194, which are engaged by fixed brushes 196 depending from an insulated block 198 fixed around barrel portion 182.

The number and arrangement of pole pieces on the core 188 will depend on the particular electrical output required, the windings 190 being connected to slip rings 194 as necessary. The wiring has been omitted for clarity since the connections may vary considerably.

In one position of the armature 186 relative to poles 189 the electrical output will be balanced or zero. When control knob 116 is turned to a selected heading, the poles will move relative to armature 186, which is held by the compass magnet, resulting in an unbalanced electrical output which can be used to actuate the aircraft controls to turn to the selected heading. This type of magnetic pick-off is well known in the art, as are electrically actuated control systems, the pick-off illustrated merely being an example. Other pick-offs of variable capacitance, variable resistance, or even electro-mechanical types may also be adapted to the heading unit, according to the type of output required.

It is understood that minor variation from the form of the invention disclosed herein may be made without departure from the spirit and scope of the invention, and that the specification and drawings are to be considered as merely illustrative rather than limiting.

I claim:
1. A magnetic heading control, comprising:
a casing;
a directional compass magnet having a shaft fixed thereto and being mounted for free rotation about a fixed axis in said casing;
a hollow cylindrical valve body rotatably mounted in said casing coaxial with said shaft and having an air inlet from the exterior of the casing;
said valve body having a pair of substantially diametrically opposed and axially spaced ports;
a sleeve fixed in said valve body and having a pair of diametrically and axially opposed apertures communicating individually with said ports;
passages in said casing communicating with said ports individually in all positions of the valve body and having vacuum source connections therein;
said shaft having a flat portion disposed between said apertures and constituting a valve element to expose said apertures equally in one position for neutral operation, and unequally for differential control of vacuum in said passages;
a control knob secured to said valve body for rotation thereof relative to said shaft;
and a graduated dial fixed to said control knob.

2. A magnetic heading control, comprising:
a casing;
a directional compass magnet having a shaft fixed thereto and being mounted for free rotation about a fixed axis in said casing;
a hollow cylindrical valve body rotatably mounted in said casing coaxial with said shaft and having an air inlet from the exterior of the casing;
said valve body having a pair of substantially diametrically opposed and axially spaced ports;
a sleeve fixed in said valve body and having a pair of diametrically and axially opposed apertures communicating individually with said ports;
passages in said casing communicating with said ports individually in all positions of the valve body and having vacuum source connections therein;
said shaft having a flat portion disposed between said apertures and constituting a valve element to expose said apertures equally in one position for neutral operation, and unequally for differential control of vacuum in said passages;
a graduated compass card of diamagnetic material fixed to said magnet to rotate therewith;
a control knob secured directly to said valve body for rotation thereof relative to said shaft;
said control knob having a dial thereon graduated to correspond with said compass card and being mounted adjacent to and in visual alignment with the compass card for comparative viewing of the dial and compass card.

References Cited by the Examiner

UNITED STATES PATENTS

| | | | |
|---|---|---|---|
| 1,406,405 | 2/1922 | McGee | 137—46 X |
| 2,199,850 | 5/1940 | Carter | 137—45 X |
| 2,378,829 | 6/1945 | Carlson | 137—46 X |
| 2,400,126 | 5/1946 | Matthews | 244—78 |
| 2,683,434 | 7/1954 | Weeks | 114—144 |

ISADOR WEIL, *Primary Examiner.*

CLARENCE R. GORDON, *Examiner.*